United States Patent
Supalov et al.

(10) Patent No.: US 8,281,060 B2
(45) Date of Patent: Oct. 2, 2012

(54) VIRTUAL HETEROGENEOUS CHANNEL FOR MESSAGE PASSING

(75) Inventors: Alexander V. Supalov, Erftstadt (DE); Vladimir D. Truschin, Sarov (RU); Alexey V. Ryzhykh, Sarov (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/082,649

(22) Filed: Apr. 8, 2011

(65) Prior Publication Data

US 2011/0185100 A1    Jul. 28, 2011

Related U.S. Application Data

(63) Continuation of application No. 12/290,615, filed on Oct. 31, 2008, now Pat. No. 7,949,815, which is a continuation-in-part of application No. 11/528,201, filed on Sep. 27, 2006, now abandoned.

(51) Int. Cl.
*G06F 13/14* (2006.01)
*G06F 15/167* (2006.01)

(52) U.S. Cl. ............... 710/305; 709/213; 709/216

(58) Field of Classification Search ............... 710/200, 710/305; 709/213–216
See application file for complete search history.

(56) References Cited

U.S. PATENT DOCUMENTS

| | | | |
|---|---|---|---|
| 4,395,757 A * | 7/1983 | Bienvenu et al. | ............... 718/104 |
| 4,862,350 A | 8/1989 | Orr et al. | |
| 5,214,759 A | 5/1993 | Yamaoka et al. | |
| 5,224,215 A | 6/1993 | Disbrow | |
| 5,333,269 A | 7/1994 | Calvignac et al. | |
| 5,357,612 A | 10/1994 | Alaiwan | |
| 5,434,975 A | 7/1995 | Allen | |
| 5,463,629 A | 10/1995 | Ko | |
| 5,502,840 A | 3/1996 | Barton | |
| 5,606,666 A | 2/1997 | Grant et al. | |
| 5,617,537 A | 4/1997 | Yamada et al. | |
| 5,625,795 A | 4/1997 | Sakakura et al. | |
| 5,706,516 A | 1/1998 | Chang et al. | |
| 5,815,167 A * | 9/1998 | Muthal et al. | ............... 345/541 |
| 5,860,126 A | 1/1999 | Mittal | |
| 5,911,051 A * | 6/1999 | Carson et al. | ............... 710/107 |
| 6,018,763 A | 1/2000 | Hughes et al. | |
| 6,038,592 A | 3/2000 | Verplanken et al. | |

(Continued)

FOREIGN PATENT DOCUMENTS

EP    628914 A1 * 12/1994

(Continued)

OTHER PUBLICATIONS

"NNRD452163: Method for Preserving DOS Compatibility Using Remote IO Subsystems", Dec. 1, 2001, IBM, IBM Technical Disclosure Bulletin, Iss. 452, p. 2145.*

(Continued)

*Primary Examiner* — Faisal M Zaman
(74) *Attorney, Agent, or Firm* — Trop, Pruner & Hu, P.C.

(57) ABSTRACT

A technique includes using a virtual channel between a first process and a second process to communicate messages between the processes. Each message contains protocol data and user data. All of the protocol data is communicated over a first channel associated with the virtual channel, and the user data is selectively communicated over at least one other channel associated with the virtual channel.

10 Claims, 15 Drawing Sheets

U.S. PATENT DOCUMENTS

| | | | |
|---|---|---|---|
| 6,075,787 A | 6/2000 | Bobeck et al. | |
| 6,182,168 B1 * | 1/2001 | Guthrie | 710/52 |
| 6,243,793 B1 * | 6/2001 | Aucsmith et al. | 711/151 |
| 6,314,501 B1 | 11/2001 | Gulick et al. | |
| 6,314,563 B1 | 11/2001 | Agesen et al. | |
| 6,385,658 B2 | 5/2002 | Harter, et al. | |
| 6,467,011 B2 | 10/2002 | Scardamalia et al. | |
| 6,510,478 B1 * | 1/2003 | Jeffords et al. | 710/200 |
| 6,601,089 B1 | 7/2003 | Sistare et al. | |
| 6,665,601 B1 | 12/2003 | Nielson | |
| 6,704,765 B1 | 3/2004 | Chang et al. | |
| 6,718,398 B1 | 4/2004 | Dontje et al. | |
| 6,752,836 B1 * | 6/2004 | Copeland et al. | 718/102 |
| 6,779,090 B2 * | 8/2004 | McKenney et al. | 711/152 |
| 6,799,317 B1 * | 9/2004 | Heywood et al. | 719/313 |
| 6,810,470 B1 | 10/2004 | Wiseman et al. | |
| 6,886,031 B2 | 4/2005 | Venkatsubramanian et al. | |
| 6,920,485 B2 | 7/2005 | Russell | |
| 6,978,143 B1 | 12/2005 | Vialen | |
| 7,032,023 B1 | 4/2006 | Barrett et al. | |
| 7,124,211 B2 | 10/2006 | Dickson et al. | |
| 7,142,650 B1 | 11/2006 | Kult et al. | |
| 7,216,349 B2 * | 5/2007 | Chen et al. | 719/314 |
| 7,231,638 B2 | 6/2007 | Blackmore et al. | |
| 7,287,127 B2 | 10/2007 | Anand et al. | |
| 7,313,794 B1 * | 12/2007 | Ansari | 718/102 |
| 7,373,438 B1 | 5/2008 | DeBergalis et al. | |
| 7,383,368 B2 | 6/2008 | Schopp | |
| 7,472,208 B2 * | 12/2008 | Rothman et al. | 710/36 |
| 7,886,300 B1 * | 2/2011 | Long et al. | 718/104 |
| 7,949,815 B2 * | 5/2011 | Supalov et al. | 710/305 |
| 7,996,848 B1 * | 8/2011 | McClure et al. | 718/108 |
| 2002/0013822 A1 | 1/2002 | West | |
| 2002/0087769 A1 * | 7/2002 | McKenney et al. | 710/200 |
| 2003/0023776 A1 | 1/2003 | Kolinummi et al. | |
| 2003/0070021 A1 * | 4/2003 | Joy et al. | 710/200 |
| 2003/0220987 A1 | 11/2003 | Pearson | |
| 2005/0021658 A1 | 1/2005 | Nicholas et al. | |
| 2005/0080963 A1 * | 4/2005 | Schopp | 710/200 |
| 2006/0075119 A1 * | 4/2006 | Hussain et al. | 709/227 |
| 2006/0136640 A1 * | 6/2006 | Tuan | 710/260 |
| 2006/0167825 A1 | 7/2006 | Sayal | |
| 2006/0184672 A1 | 8/2006 | Lauer et al. | |
| 2006/0242327 A1 * | 10/2006 | Knight et al. | 709/248 |
| 2006/0259572 A1 * | 11/2006 | Brown | 709/213 |
| 2007/0097952 A1 | 5/2007 | Truschin | |
| 2007/0124728 A1 * | 5/2007 | Rosenbluth et al. | 718/100 |
| 2007/0293984 A1 * | 12/2007 | Lin et al. | 700/245 |
| 2010/0042788 A1 | 2/2010 | Lee et al. | |
| 2010/0191823 A1 * | 7/2010 | Archer et al. | 709/213 |
| 2011/0289180 A1 * | 11/2011 | Sonnier et al. | 709/213 |

FOREIGN PATENT DOCUMENTS

| | | |
|---|---|---|
| EP | 629955 A1 * | 12/1994 |
| JP | 04236647 | 8/1992 |
| JP | 04295952 | 10/1992 |
| JP | 08016540 | 1/1996 |
| JP | 11085518 | 3/1999 |
| JP | 11120157 | 4/1999 |
| JP | 2000339181 | 12/2000 |
| JP | 2006048249 | 2/2006 |

OTHER PUBLICATIONS

Demaine, E.D.; Foster, I.; Kesselman, C.; Snir, M.; , "Generalized communicators in the message passing interface," Parallel and Distributed Systems, IEEE Transactions on , vol. 12, No. 6, pp. 610-616, Jun. 2001.*

Yamagiwa, S.; Sousa, L.; "CaravelaMPI: Message Passing Interface for Parallel GPU-Based Applications," Parallel and Distributed Computing, 2009. ISPDC '09. Eighth International Symposium on , pp. 161-168, Jun. 30-Jul. 4, 2009.*

Göhringer, D.; Hübner, M.; Hugot-Derville, L.; Becker, J.; , "Message Passing Interface support for the runtime adaptive multi-processor system-on-chip RAMPSoC," Embedded Computer Systems (SAMOS), 2010 International Conference on , pp. 357-364, Jul. 19-22, 2010.*

Liao, et al. "An Implementation and Evaluation of Client-Side File Caching for MPI-IO," Mar. 26-30, 2007, IEEE International Parallel and Distributed Processing Symposium, pp. 1-10.

Tota, et al., "MEDIA: a hybrid shared-memory/message-passing multiprocessor NoC-based architecture," Mar. 8-12, 2010, IEEE, Design, Automation and Test in Europe Conference and Exhibition (date), pp. 45-50.

Buntinas et al., "Optimizing synchronization operations for remote memory communication systems," Apr. 22-26, 2003, IEEE, Proceedings of the International Parallel and Distributed Processing Symposium, pp. 1-8.

Wong, et al., "The design of MPI based distributed shared memory systems to support OpenMP on cluster," Sep. 17-20, 2007, 2007 IEEE International Conference on Cluster Computing, pp. 231-240.

Office Action dated Jul. 9, 2008 issued by the U.S. Patent and Trademark Office with corresponding Reply to Office Action filed on Oct. 9, 2008 in related U.S. Appl. No. 11/528,201.

* cited by examiner

VIRTUAL HETEROGENEOUS CHANNEL FOR MESSAGE PASSING

This application is a continuation of U.S. patent application Ser. No. 12/290,615, filed Oct. 31, 2008, now U.S. Pat. No. 7,949,815 which is a continuation-in-part of U.S. application Ser. No. 11/528,201, filed Sep. 27, 2006, now abandoned the content of which is hereby incorporated by reference.

BACKGROUND

Embodiments generally relate to a virtual heterogeneous channel for message passing. Processes typically communicate through internode or intranode messages. There are many different types of standards that have been formed to attempt to simplify the communication of messages between processes. One such standard is the message passing interface (called "MPI"). MPI: A Message-Passing Interface Standard, Version 2.1, Message Passing Interface Forum, Jun. 23, 2008. MPI is essentially a standard library of routines that may be called from programming languages, such as FORTRAN and C. MPI is portable and typically fast due to optimization of the platform on which it is run.

DETAILED DESCRIPTION

In accordance with embodiments of the invention described herein two processes communicate messages with each other using a virtual heterogeneous channel. The virtual heterogeneous channel provides two paths for routing the protocol and user data that is associated with the messages: a first channel for routing all of the protocol data and some of the user data; and a second channel for routing the rest of the user data. As described below, in some embodiments of the invention, the selection of the channel for communicating the user data may be based on the size of the message or some other criteria. The virtual heterogeneous channel may be used for intranode communication or internode communication, depending on the particular embodiment of the invention.

Figure 1:
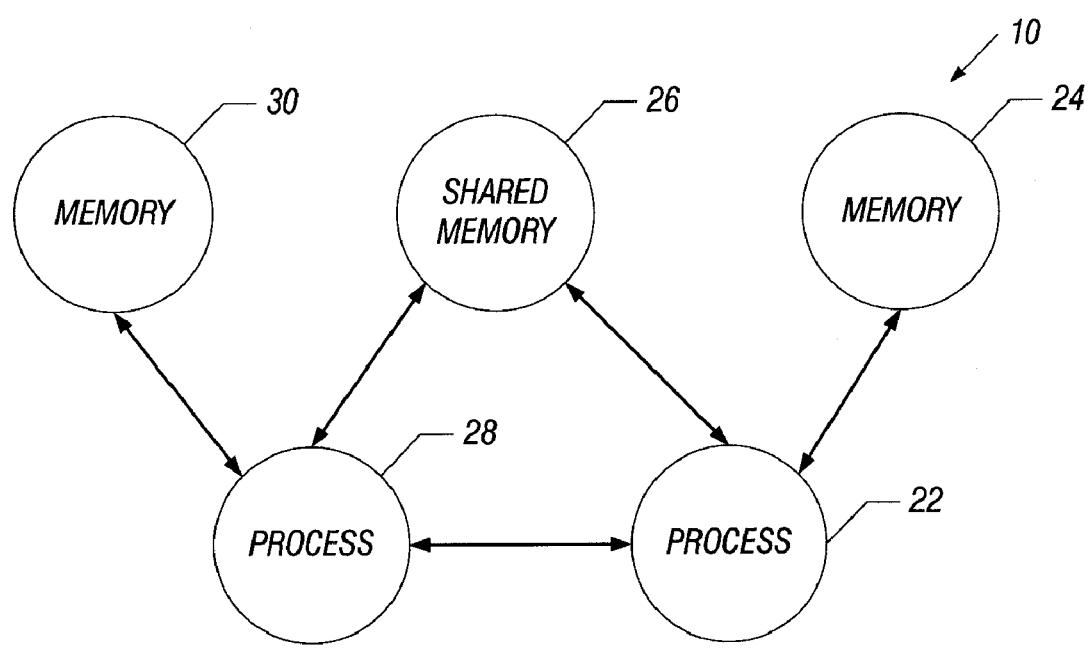
FIG. 1 is a schematic diagram of a system according to an embodiment of the invention.

As a more specific example, FIG. 1 depicts an exemplary system 10 in which two processes 22 and 28 establish and use a virtual heterogeneous channel for purposes of intranode communication of messages in accordance with some embodiments of the invention. The processes 22 and 28 have access to a shared memory 26, which forms a shared memory channel (of the virtual heterogeneous channel) to communicate all message protocol data, an approach that maintains an order to the communication of messages between the processes 22 and 28, regardless of the channel that is used for communication of the associated user data. For a relatively small message, the shared memory channel also is used to communicate the user data of the message. In accordance with some embodiments of the invention, for a small message, the use of the shared memory channel may be similar to an "eager" protocol in which both the envelope and the payload data of the message are communicated at the same time from one process 22, 28 to the other. Thus, the shared memory 26 may serve as a temporary buffer for storing an incoming message for the process 22, 28 before the process 22, 28 has the available storage or processing capability to retrieve the message from the shared memory 26.

For larger messages, however, the shared memory channel may be relatively inefficient for purposes of communicating user data, and as a result, the processes 22 and 28, in accordance with embodiments of the invention described herein, use a technique that is better suited for these larger messages. More specifically, a higher bandwidth channel for larger message sizes is used for purposes of communicating the user data for large messages. In accordance with some embodiments of the invention, a Direct Access Programming Library (DAPL) channel may be used to communicate larger messages. The DAPL establishes an interface to DAPL transports, or providers. An example is the Direct Ethernet Transport (DET).

Other architectures are within the scope of the appended claims. For example, in some embodiments of the invention, InfiniBand Architecture with RDMA capabilities may be used. The InfiniBand Architecture Specification Release 1.2 (October 2004) is available from the InfiniBand Trade Association at www.infinibandta.org. The DAPL channel has an initial large overhead that is attributable to setting up the user data transfer, such as the overhead associated with programming the RDMA adaptor with the destination address of the user data. However, after the initial setup, a data transfer through the DAPL channel may have significantly less latency than its shared memory channel counterpart.

More particularly, using the DAPL channel, one process 22, 28 may transfer the user data of a message to the other process 22, 28 using zero copy operations in which data is copied directly into a memory 24, 30 that is associated with the process 22, 28. The need to copy data between application memory buffers associated with the processes 22, 28 is eliminated, as the DAPL channel may reduce the demand on the host central processing unit(s) (CPU(s)) because the CPU(s) may not be involved in the DAPL channel transfer.

Due to the above-described latency characteristics of the DAPL and shared memory channels, in accordance with embodiments of the invention described herein, for smaller messages, the user data is communicated through the shared memory channel and for larger messages, the user data is communicated through the DAPL channel. It is noted that because the shared memory channel communicates all message protocol data (regardless of message size), ordering of the messages is preserved.

Figure 2:
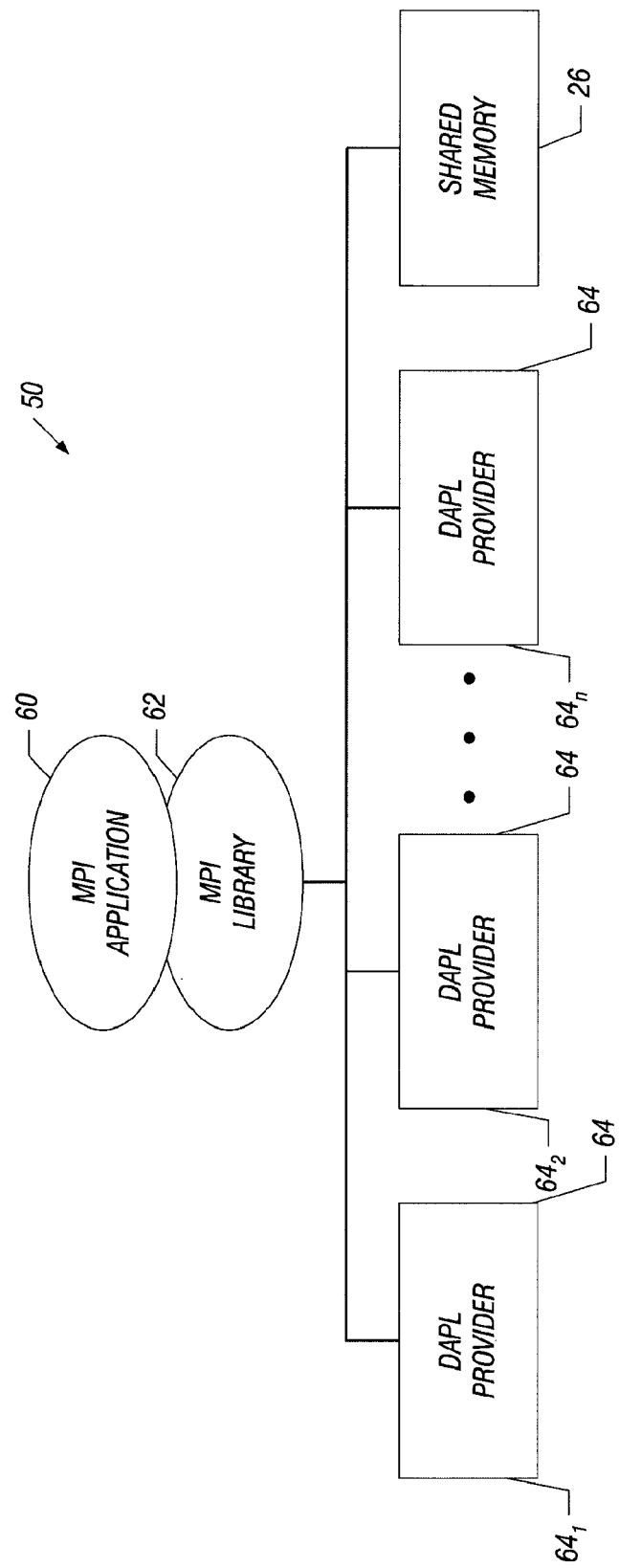
FIG. 2 is a schematic diagram of a software architecture associated with a process of FIG. 1 according to an embodiment of the invention.

FIG. 2 generally depicts an exemplary software architecture 50 that may be used by each of the processes 22 and 28 in accordance with some embodiments of the invention. The architecture 50 includes a message processing interface (MPI) application layer 60 and an MPI library 62. A process, via the execution of the MPI application layer 60, may generate a message that contains user data that may, via the MPI library 62, be communicated to another process through either the shared memory or through a DAPL provider 64 (DAPL providers $64_1$, $64_2$ ... $64_n$, being depicted as examples); and the associated protocol data is communicated via the shared memory 26.

Figure 3:
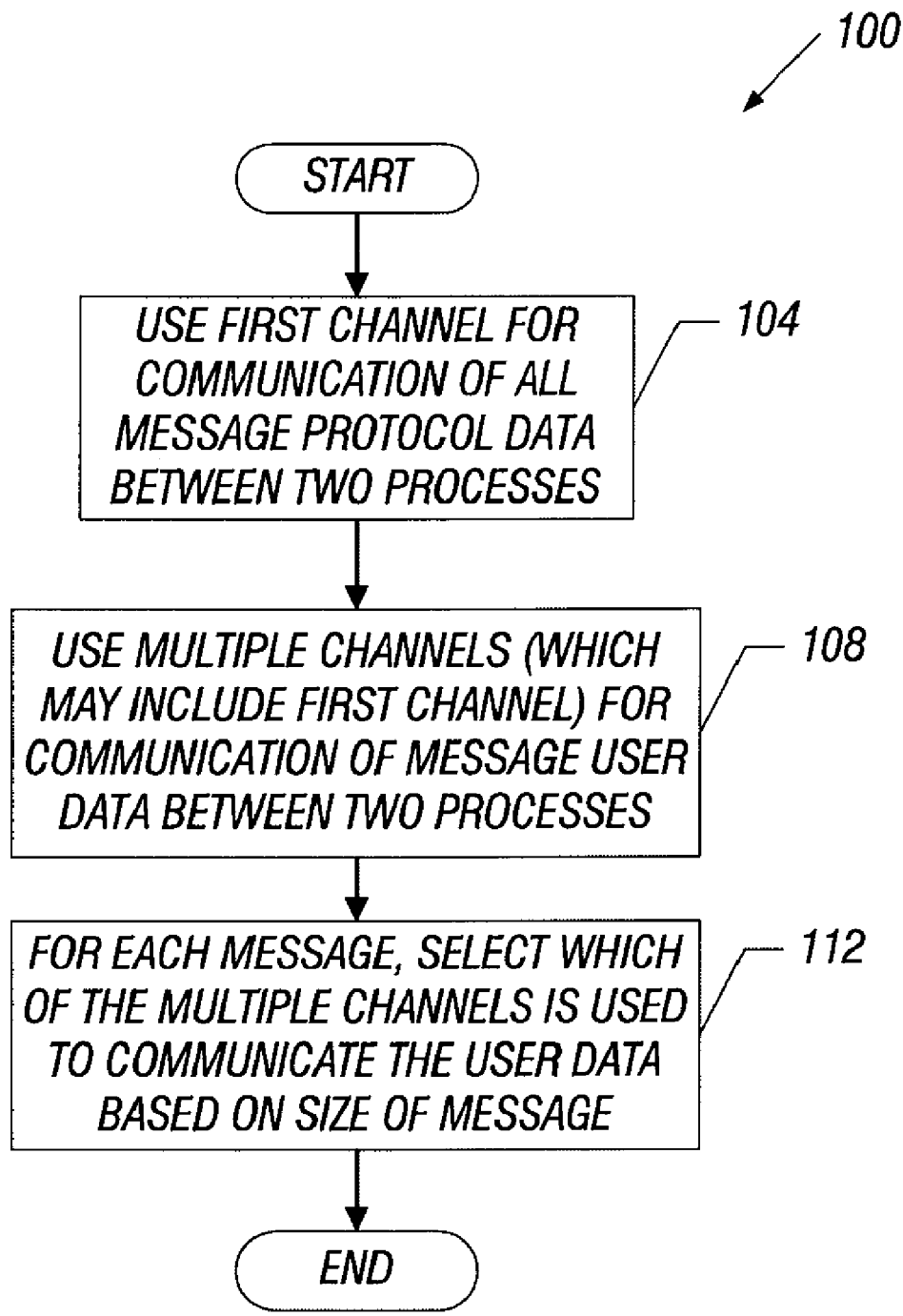
FIG. 3 is a flow diagram depicting a technique to communicate between two processes using a virtual heterogeneous channel according to an embodiment of the invention.

Referring to FIG. 3, to summarize, a technique 100 to communicate a message between two processes includes using (block 104) a first channel to communicate all message protocol data between the two processes and using (block 108) multiple channels to communicate the message user data between the two processes. It is noted that these multiple channels may include the first channel that is also used to communicate all of the message protocol data, in accordance with some embodiments of the invention. Pursuant to block 112, for each message, one of the multiple channels is selected and used to communicate the user data based on the size of the message.

Figure 4:
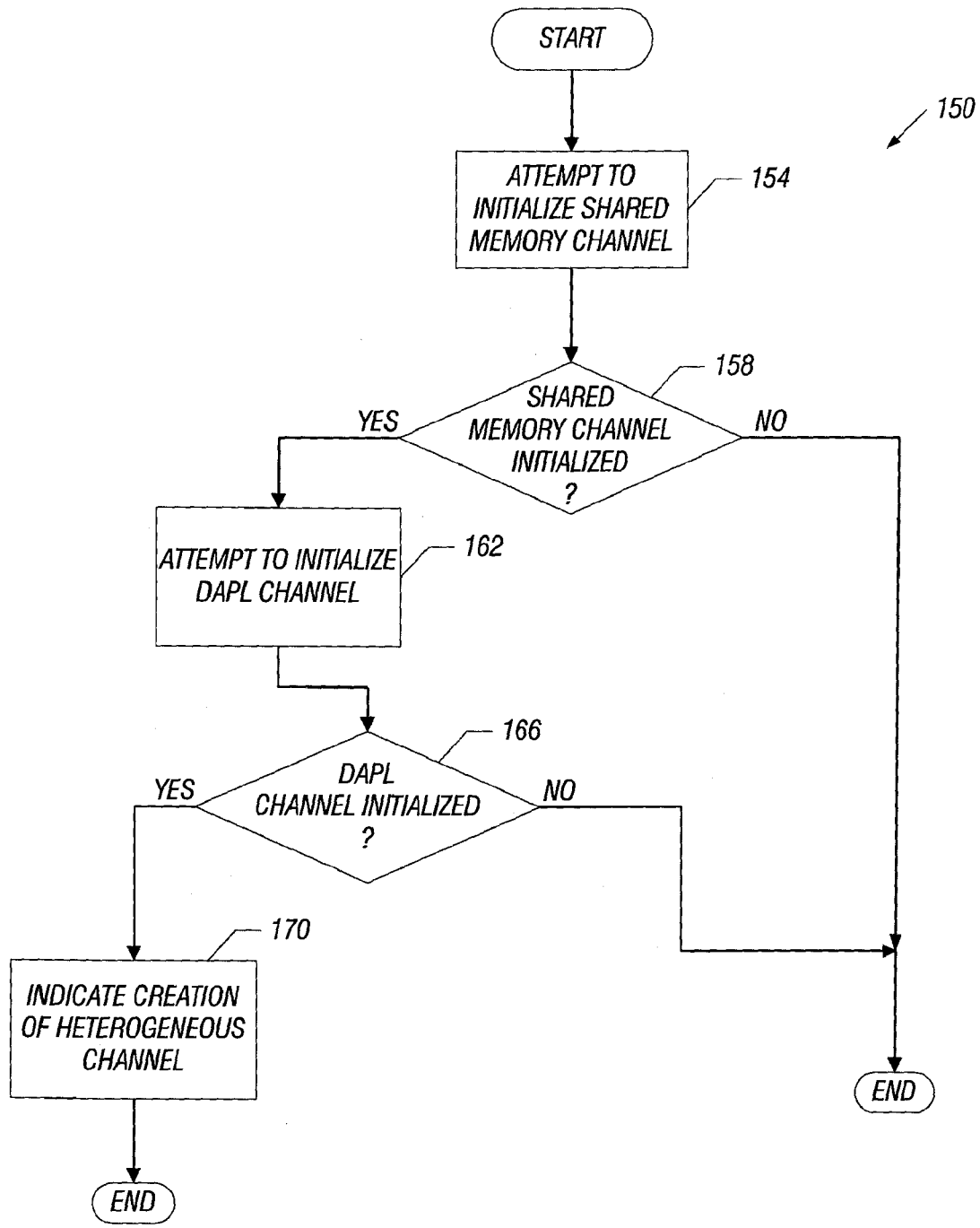
FIG. 4 is a flow diagram depicting a technique to initialize the virtual heterogeneous channel according to an embodiment of the invention.

In accordance with some embodiments of the invention, the above-described virtual heterogeneous channel may be created by a process using a technique 150 that is depicted in FIG. 4. Pursuant to the technique 150, a process attempts (block 154) to initiate a shared memory channel. If the process is successful in initializing the shared memory channel (pursuant to diamond 158), then the process attempts (block 162) to initialize a DAPL channel. If the process is successful in initializing the DAPL channel (pursuant to diamond 166), then the process indicates (block 170) creation of the virtual heterogeneous channel.

Figure 5:
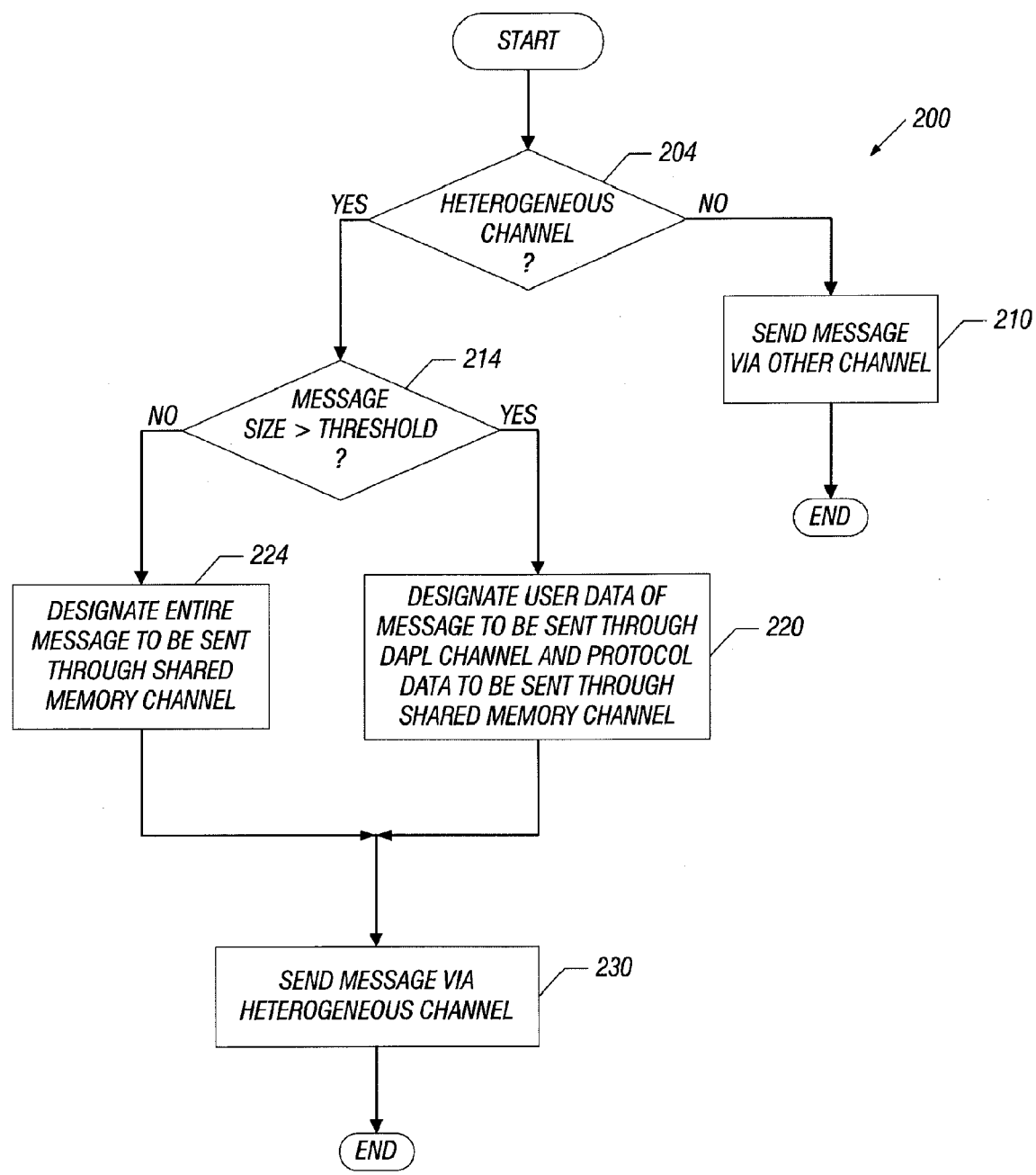
FIG. 5 is a flow diagram depicting a technique to transmit a message over the virtual heterogeneous channel according to an embodiment of the invention.

A process may transmit a message using the virtual heterogeneous channel pursuant to a technique 200 that is depicted in FIG. 5, in accordance with some embodiments of the invention. Pursuant to the technique 200, the process first determines (diamond 204) whether a virtual heterogeneous channel exists. If not, the process sends (block 210) the message via another channel. Otherwise, the process proceeds with the transmission via the virtual heterogeneous channel.

Assuming a virtual heterogeneous channel exists, the process determines (diamond 214) whether a size that is associated with the message is greater than a particular value of a threshold. If so, then the process designates the user data of the message to be sent through the DAPL channel and the protocol data to be sent through the shared memory channel, pursuant to block 220. Otherwise, if the message size is less than the value of the threshold, the process designates the entire message to be sent through the shared memory channel, pursuant to block 224. Subsequently, the message is sent via the virtual heterogeneous channel, pursuant to block 230.

Figure 6:
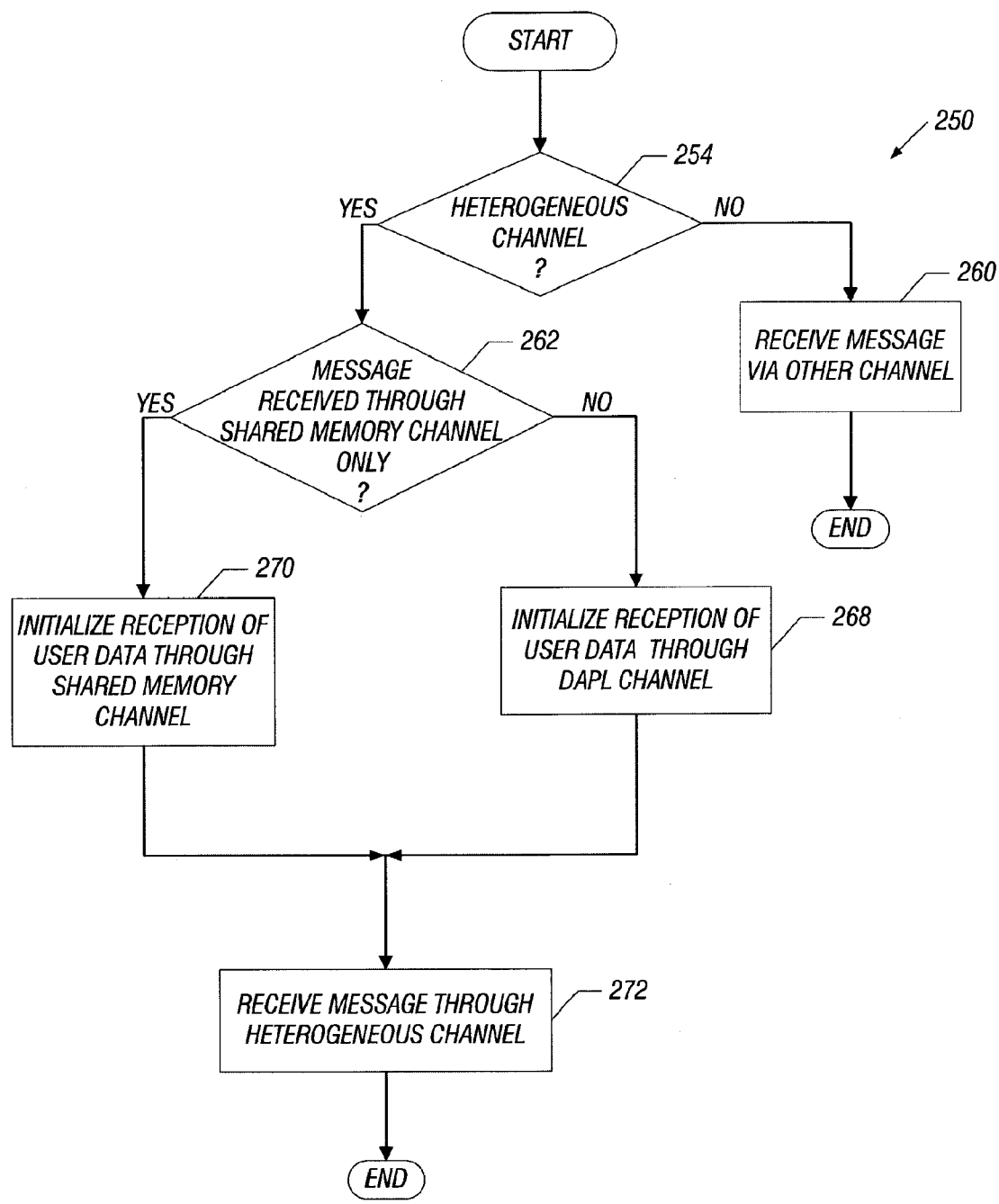
FIG. 6 is a flow diagram depicting a technique to receive a message from the virtual heterogeneous channel according to an embodiment of the invention.

For purposes of receiving a message via the virtual heterogeneous channel, a process may use a technique 250, which is depicted in FIG. 6. Pursuant to the technique 250, the process determines (diamond 254) whether a virtual heterogeneous channel exists. If not, then the message is received via another channel, pursuant to block 260.

Otherwise, if a virtual heterogeneous channel exists, then the process determines (diamond 262) whether the message received is through the shared memory channel only. If so, then the process initializes (block 270) the reception of the user data through the shared memory channel. It is noted that the protocol data is always transmitted through the shared memory channel. If the message is not received only through the shared memory channel, then the process initializes (block 268) the reception of the user data through the DAPL channel. After the reception of the message has been initialized, the process receives the message through the heterogeneous channel, pursuant to block 272.

Other embodiments are within the scope of the appended claims. For example, in accordance with other embodiments of the invention, the selection of the channel for communicating the user data may be based on criteria other than message size. More specifically, every n-th message may be sent through the DAPL channel for purposes of balancing the load between the DAPL and shared memory channels.

Embodiments further allow a MPI library to work efficiently in event driven (wait) mode during simultaneous data transfers through shared memory inside a node, and through other communication fabrics between nodes like Ethernet and InfiniBand. This minimizes processor cycles spent on memory and device polling, and thus increases availability to user data processing, and drives down dissipated heat.

By introducing a wait (or event driven) mode into a MPI library, substantially reduced CPU overhead associated with polling can be realized, and nearly uniform performance for unifabric and multifabric communication configurations may be obtained. One embodiment may work as follows. During MPI process initialization, a small shared memory segment is created. This segment contains a synchronization block for every process, identified by the process rank. The information about the location of this shared memory segment is distributed across the MPI job using out-of-band communication such as a process management interface (PMI). Each block may include, among other information, the following fields: a "wait" flag which is set to TRUE when the process involved enters the wait state; a "wake_up" message counter that counts the number of messages that has been sent to other processes but not yet received by them; a "connection" counter that contains the number of connections initiated by other processes to the process involved; and pointer to a mutex that is used to synchronize processes during modification or inquiry of the synchronization block contents.

Figure 7:
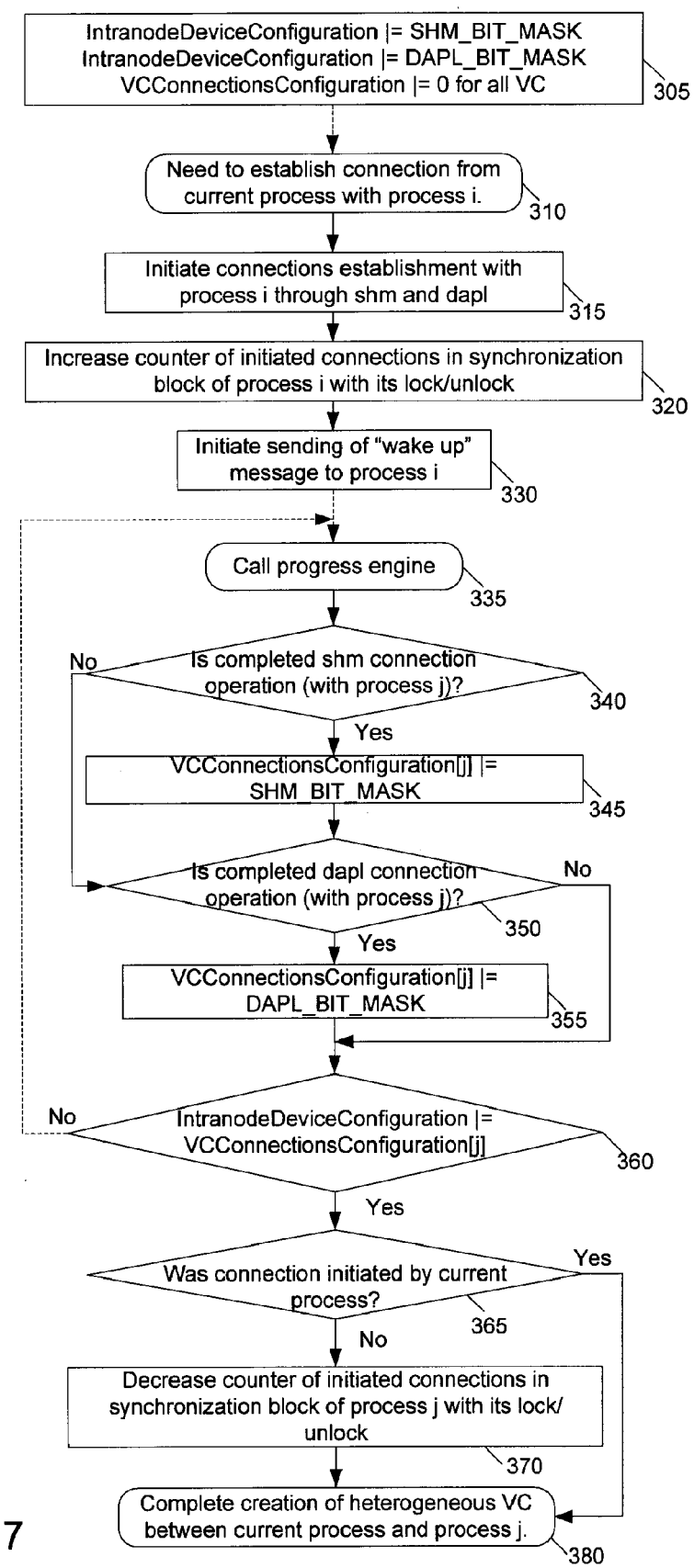
FIG. 7 is a flow diagram of a technique for creating a heterogeneous virtual channel in accordance with one embodiment of the present invention.

During connection establishment, heterogeneous channels may be employed, as described in FIG. 7, which is a flow diagram of a method 300 in accordance with one embodiment of the present invention. As an overview of the method, the global variable IntranodeDeviceConfiguration is a bit scale to define what fabrics are to be used for the intranode transfers. Thus, if for a particular connection, these variables instruct the MPI to use more than one fabric, this will be done. A variable VCConnectionsConfiguration stores information about the actually established connections. It is stored in the respective VC structure. Once all necessary connections are established, the heterogeneous channel is considered established and open for MPI communication.

In various embodiments, the wait mode is implemented using only intranode heterogeneous channels, like SHM-DAPL for shared memory and DAPL transfers, or SHM-SOCK for shared memory and sockets. If one process initializes a shared memory connection to another intranode process, it increments the counter of the initialized connections, and starts sending a wake-up message (e.g., blocks 320 and 330 of FIG. 7). This latter message is sent over a secondary fabric (like DAPL or sockets) immediately upon connection establishment. The counter of the initialized connections is decremented upon processing of the wake-up message and completion of the connection establishment (e.g., blocks 370 and 380 of FIG. 7).

Specifically, as shown in FIG. 7, method 300 may begin by initializing the global variable IntranodeDeviceConfiguration to SHM_BIT_MASK and DAPL_BIT_MASK, and setting the VCConnectionsConfiguration variable to zero for all virtual channels (block 305) at MPI initialization time. When there is a need to establish a connection from the current process to process I (block 310), the connection establishment may be initiated with process I through SHM and DAPL if it is not previously initiated (block 315). At block 320, a counter of initiated connections may be increased in the synchronization block of process I with its lock/unlock mechanism (block 320).

Accordingly, method 300 may next initiate sending of a wakeup message to process I (block 330). This triggers a progress engine, which is called at block 335. Thus a SHM connection with this process may be established. It may next be determined if the SHM connection is established with process J (diamond 340) and if so the variable VCConnectionsConfiguration for this connection may be set to SHM_BIT_MASK (block 345). It may be determined whether the DAPL connection operation has been completed (diamond 350). If so, the variable VCConnectionsConfiguration for this connection may be set to DAPL_BIT_MASK (block 355). Then it may be determined whether the variable IntranodeDeviceConfiguration is equal to VCConnectionsConfiguration value (diamond 360). If so, control passes to diamond 365.

At diamond 365 it may be determined whether the established connection was initiated by the current process. If so, control passes to block 380, below. Otherwise a counter of initiated connections in the synchronization block for process J may be decremented (block 370). Finally, method 300 concludes with the completion of the creation of a heterogeneous VC between current and J processes (block 380). In this way, creation of an intranode heterogeneous VC between two processes can be performed in RDSSM wait mode.

Figure 8:
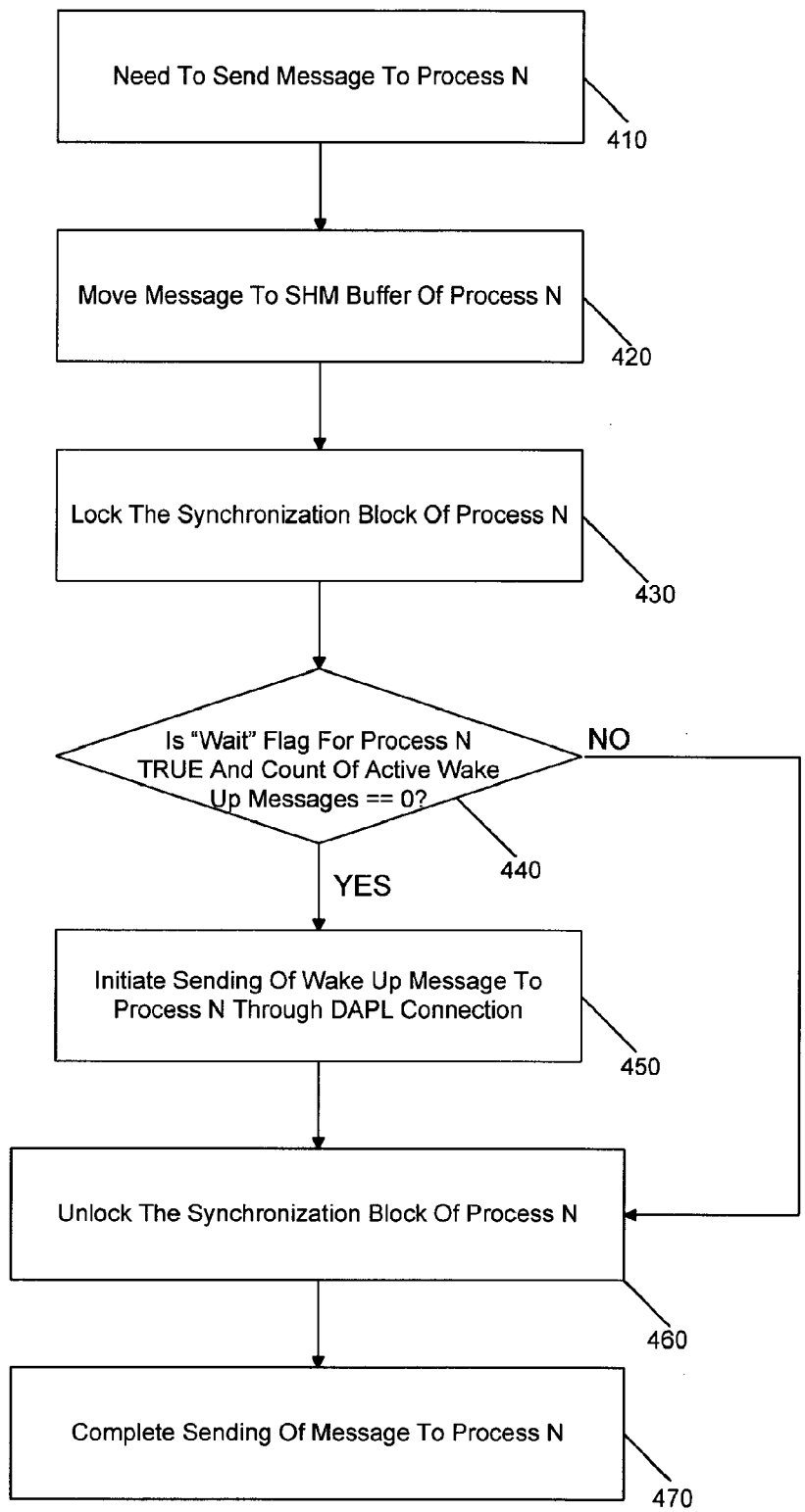
FIG. 8 is a flow diagram of sending a message in wait mode to a process through a shared memory channel in accordance with one embodiment of the present invention.

Referring now to FIG. 8, shown is a flow diagram of sending a message to process N through a shared memory channel in the wait mode. As shown in FIG. 8, method 400 may begin with a need to send a message to process N (block 410). Then the message may be moved to the SHM buffer of process N (block 420). Furthermore, a synchronization block of process N may be locked (block 430). Then it may be determined whether the wait flag for process N is true and the count of active wakeup messages is zero (diamond 440). If so, control passes to block 450 to initiate the sending of the wakeup message to process M through the DAPL connection, and unlocking the synchronization block of process N (block 460). If not, control passes directly from diamond 440 to block 460. Finally, at block 470 the completion of the message sent to process M may be realized.

Thus as shown in FIG. 8, during shared memory transfers, the sending process checks the wait flag in the synchronization block of the receiving process after data is written into the shared memory segment (diamond 440). If the receiving process is found in the wait state, and its wake-up counter is equal to zero, the sending process starts sending a wake-up message (block 450). So, process N will receive "wake up" message through dapl/sock connection to be activated and then receive the message through the shm connection.

Figure 9:
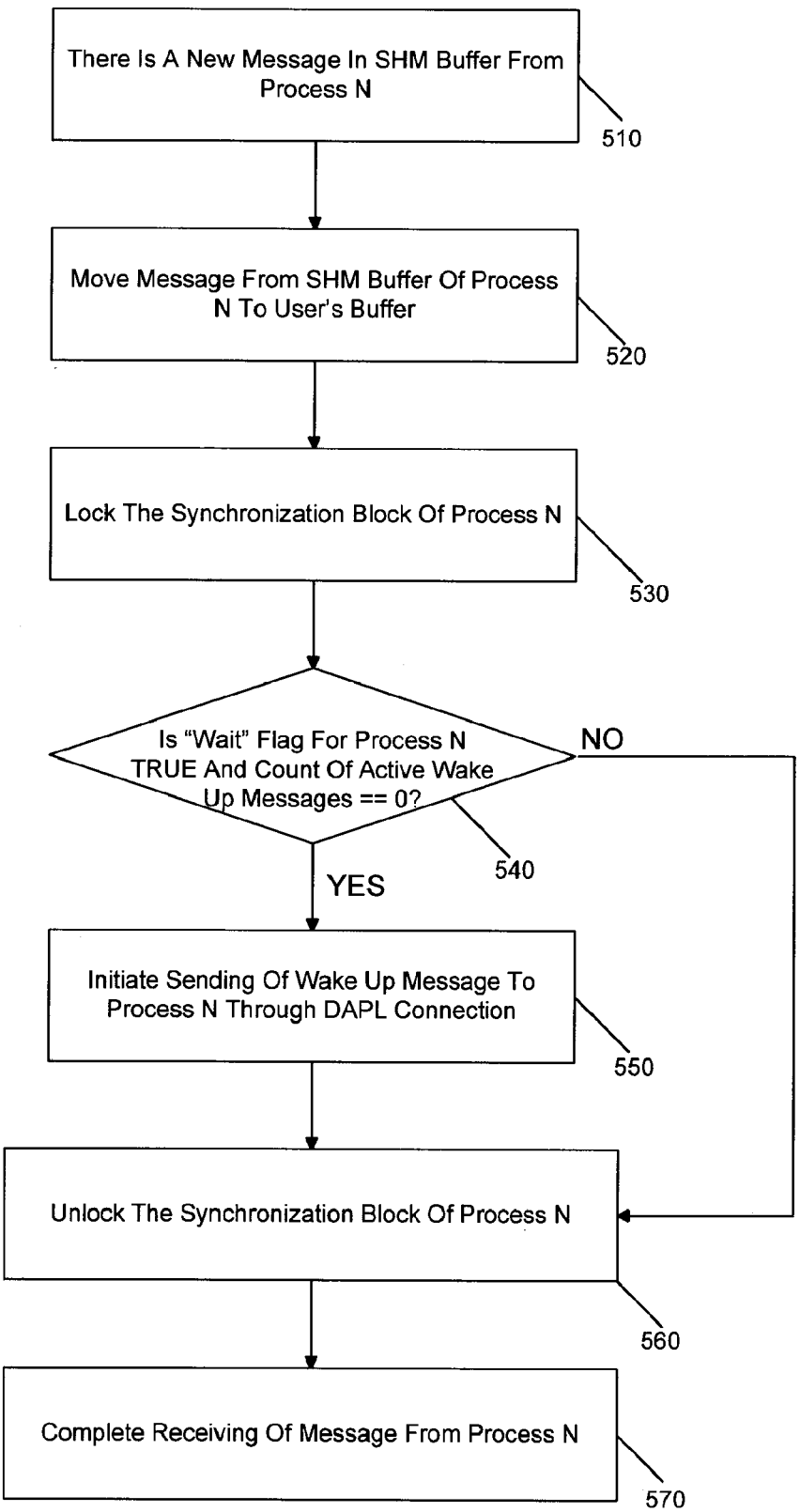
FIG. 9 is a flow diagram of a method of processing received messages in a wait mode in accordance with one embodiment of the present invention.

Referring now to FIG. 9, shown is a flow diagram for a method of processing received messages in a wait mode. Shown in FIG. 9, method 500 may begin by determining that there is a new message in a shared memory buffer from process N (block 510). The message may then be moved from the shared memory buffer of process N to the user's buffer of the current process (block 520). Furthermore, the synchronization block for process N may be locked (block 530). Then it may be determined at diamond 540 whether a wait flag for process N is true and the count of active wakeup messages equals zero. If so, control passes to block 550 where the process may initiate sending of a wakeup message to process N through the DAPL connection (block 550), and then control passes to block 560, where the synchronization block of process N may be unlocked. Note that control passes directly to block 560 from diamond 540 if either the wait flag is not set or the count of active wakeup messages is greater than zero. Finally, at block 570 the process of receiving the message from process N is completed.

Thus as shown in FIG. 9, during receiving of the shared memory data, the receiving process checks the wait flag of the sending process after reading the data from the shared memory segment (block 540). If the sending process is found in the wait state, and its wake-up counter is equal to zero, the receiving process starts sending a wake-up message (block 550). This logic allows activation of the sending process if it waits for shared buffer deallocation (block 550).

In various embodiments, the wake-up messages are sent as internal control messages, for example, through the DAPL or sockets part of the heterogeneous channel. The transfer of such messages, like of any other message, can be delayed if there are no free buffers to accommodate them. In this case, a special flag is raised in the respective VC structure, and the wake-up message is sent after the current message. The receiving process decrements the wake-up counter in its synchronization block.

Figure 10:
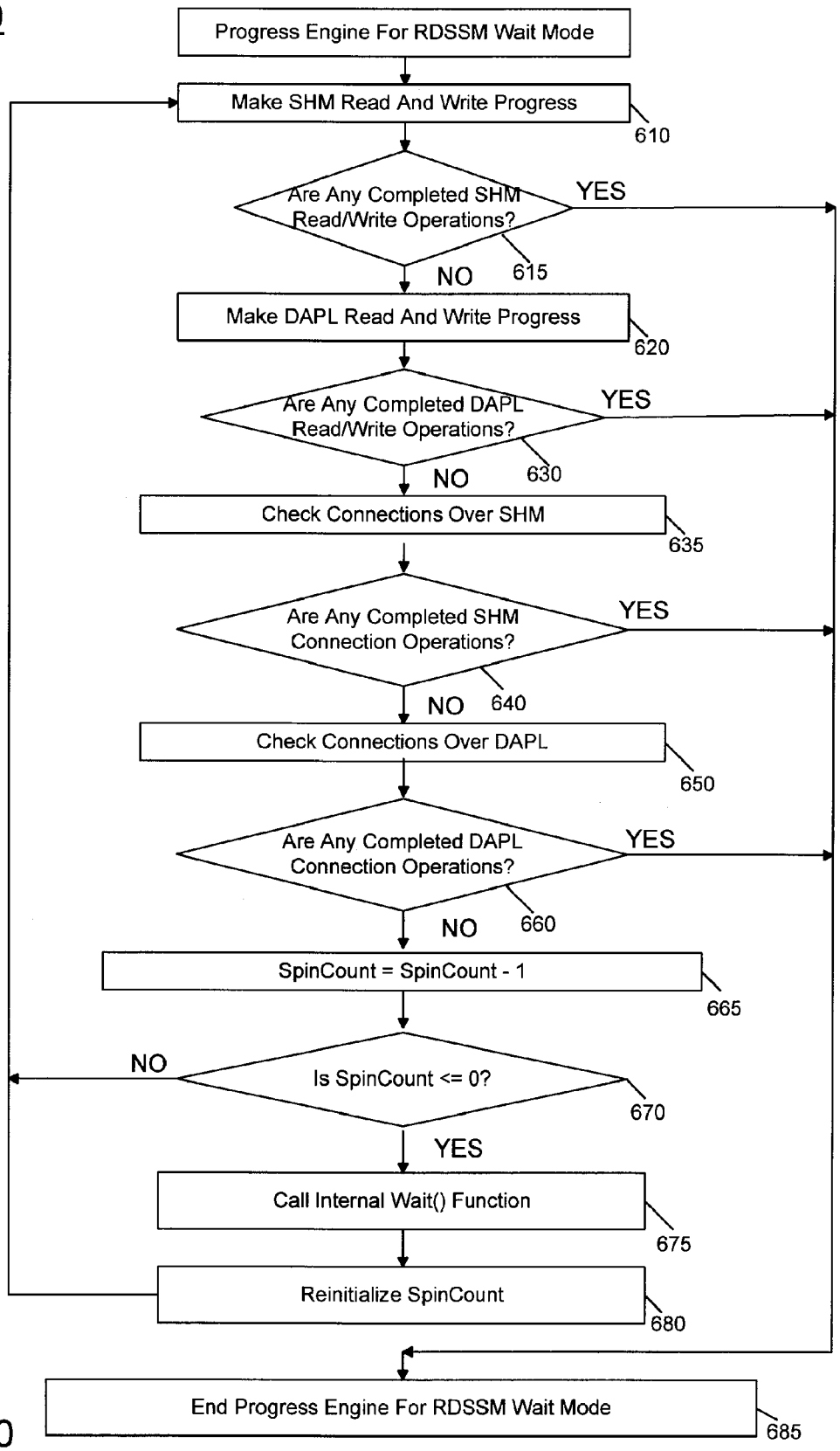
FIG. 10 is a flow diagram of blocked operation of a progress engine for a wait mode in accordance with an embodiment of the present invention.

Referring now to FIG. 10, shown is a flow diagram of operation of a progress engine for a wait mode in accordance with an embodiment of the present invention. As shown in FIG. 10, the progress at engine may begin in the RDS SM wait mode by making shared memory read and write progress (block 610). Next it may be determined whether there are any completed SHM read/write operations (diamond 615). If so, control passes to block 685, where the progress engine for the wait mode may be concluded.

Otherwise, control passes to block 620 where DAPL read and write progress may be made. Next it may be determined whether any DAPL read/write operations are completed (diamond 630). If so, the progress engine may conclude (block 685). Otherwise, connections over shared memory may be checked (block 635). It may then be determined whether there are any completed SHM connection operations at diamond 640. If so, the progress engine for the wait mode may conclude. Otherwise, connections over DAPL may be checked (block 650). It may then be determined whether there are any completed DAPL connection operations at diamond 660.

Next, at block 665 a spin count variable (SpinCount) may be decremented and at diamond 670 it may be determined whether the spin count is less than or equal to zero. If not, control passes back to block 610 discussed above. If the spin count is equal to zero, control passes to block 675, where the internal Wait( ) function may be called, and the spin count is reinitialized (block 680). Then control may pass back to block 610 for making further shared memory read/write progress. While shown with this particular implementation in the embodiment of FIG. 10, the scope of the present invention is not limited in this regard.

As shown in FIG. 10, when an MPI process calls a blocking MPI functions the progress engine executes SpinCount passes and, if there were no completed operations, it calls an internal function Wait( ) (block 675). Depending on the value of the variable SpinCount, controllable through a respective environment variable, the ratio between polling and waiting mode is changed accordingly. For example, if this variable is equal to one, a pure wait mode exists, without any polling. If this variable is equal to 250, the Wait( ) function is called relatively rarely. This approximates the efficiency of the polling mode, and at the same time, in absence of a message to react to, the process almost immediately enters the wait mode.

Figure 11:
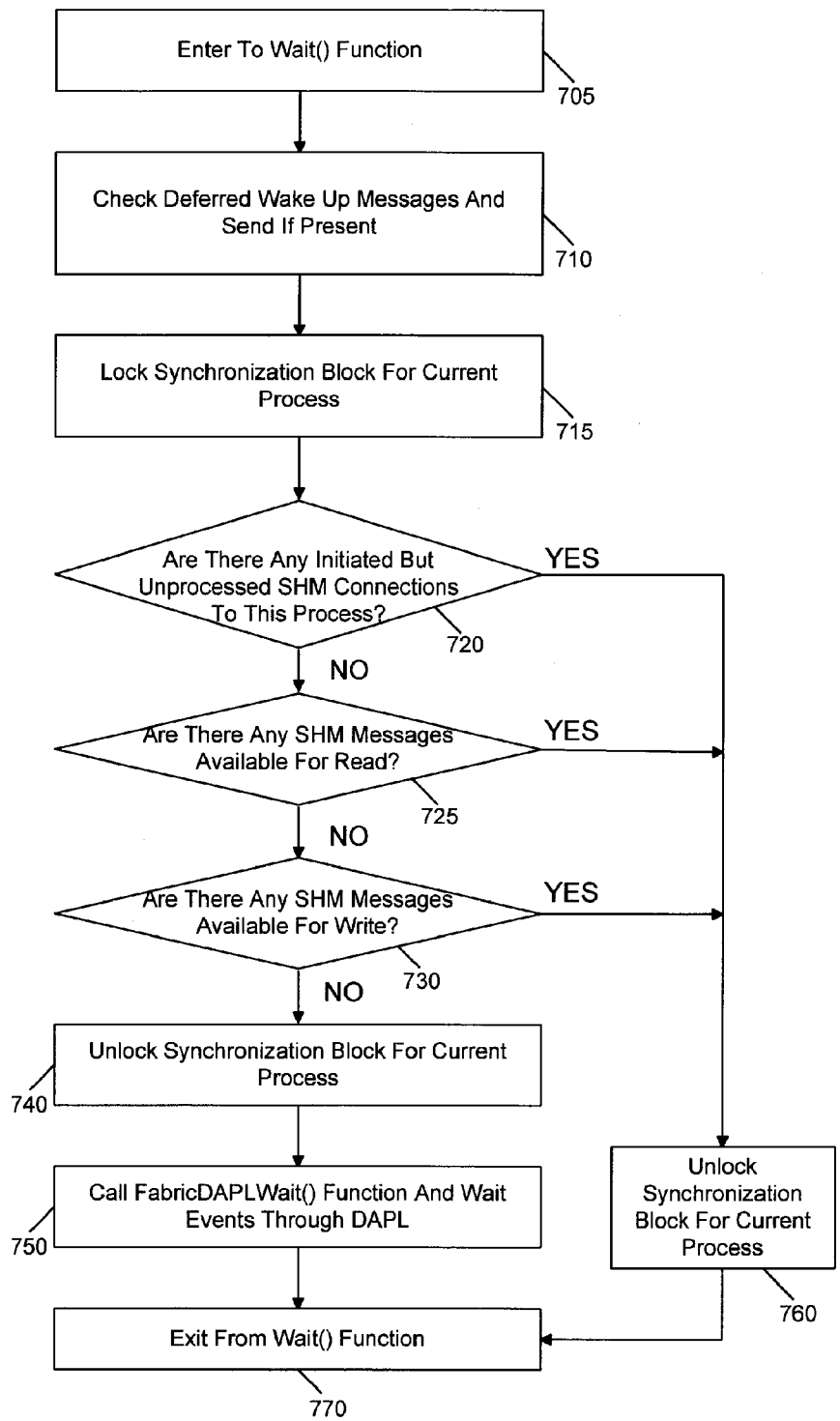
FIG. 11 is a flow diagram of a method for a wait function in accordance with one embodiment of the present invention.

Referring now to FIG. 11, shown is a flow diagram of a method for a wait function for a RDSSM wait mode. As shown in FIG. 11, method 700 may begin by entering the Wait( ) function (block 705). Next, the function may check for deferred wakeup messages and if any are present, send them along to the indicated recipient (block 710). Then the synchronization block for the current process may be locked (block 715).

Referring still to FIG. 11, next a series of determinations may be made to determine availability of various connections or messages. Specifically, at diamond 720 it may be determined whether there are any initiated but unprocessed shared memory connections to the process. At diamond 725 it may be determined whether there are any shared messages available for reading, and at diamond 730 it may be determined whether there are any shared messages available for writing. If the answer to all of these determinations is no, control passes to block 740, where the synchronization block for the current process may be unlocked and the FabricDAPLWait( ) function may be called to wait for events through DAPL (block 750). Otherwise, if any of the determinations of diamond 720, 725 and 730 are in the affirmative, control passes to block 760, where the synchronization block for the current process may be unlocked. From both of blocks 750 and 760, control passes to block 770 where the Wait( ) function may exit.

Thus in the internal function Wait( ), the wait mode is entered only after a series of conditions have been met, as shown in FIG. 11. First if there are any wake-up messages, the process sends them first as described above. Then, if there are shared memory connections initialized by other processes but still unprocessed by the current process, the process attends to them. Next, if there is a new incoming message, or a part of it, it is read. Finally, if there is a chance to continue writing a message (or a part of it) that was delayed due to absence of free communication buffers or for another reason, it is sent.

Note that if all above conditions misfire, the process calls the respective FabricXxxxWait( ) function (block 750) for the fabric used for internode data transfer (e.g., the DAPL connection). In this case the waiting process will be activated, either due to the receipt of a message from another node, or due to receipt of the wake-up message from another process on the same node.

Embodiments thus provide a unified approach to the wait mode implementation based on virtual channels. This approach reduces waiting on all active fabrics to waiting on only one of them, and merges the advantages of polling and event driven methods. Note there is no reliance on the presence of helper threads or system provided file descriptor capabilities for all the fabrics involved. This allows a MPI to use fabrics that do not have those capabilities, and to do without extra threads that tend to slow down processing.

Embodiments may further allow an MPI library to work more efficiently in event driven (wait) mode using DAPL providers that supports RDMA technologies. Specifically, the number of data transfer operations (DTOs) required for passing messages from one remote process to another can be reduced by writing data into memory of a remote process with immediate data (referred to herein as a RDMA write with immediate data) and therefore improves the performance of message passing in event driven mode.

The problem of waiting for DTO completions of a RDMA write operation from a remote process is raised during implementation of wait mode. The event for DTO completion of a RDMA from a write is delivered onto the event dispatcher (EVD) of the process that posted the operation. The process receiving data, to detect the completion of data transfer should poll memory and check head and tail flags of the incoming message. However, this method can not be applied in wait mode because of intensive processor usage. While this issue can be solved by sending special "wake-up" messages using DAPL send (on sending side) and recv (on receiving side) DTO operations, an increased number of DTO operations involved to transfer the data affects performance, and is especially sensitive at passing short size messages.

Thus in some embodiments a single "RDMA Write with immediate data" operation may be used instead of two RDMA Write and send operations. Specifically, an EVD for handling the completions of "recv" DTO is created by a function call dat_evd_create( ), at the initialization stage together with other DAPL objects.

Then when there is a necessity to transfer the data, a sending process initiates the operation "RDMA Write with immediate data" by calling the function "dat_ib_post_rdma_write-_immed_data( )." This function allows the process to send immediate data together with user data sent by RDMA write. The immediate data are delivered to the remote process inside of the event structure for a "recv" DTO completion event and effectively acts as the control message carrying part of the virtual channel. In one embodiment, a 4 byte size immediate data may be used to specify the type of operation to the receiving process. Then the receiving process handles the incoming data depending on this type. For instance, the type of operation can specify one of following cases: eager data sent through internal pre-registered buffers; a credit update message that contains information about a possibility to re-use some pre-registered buffers; or a rendezvous acknowledge message (ACK) that notifies the remote process about completion of a rendezvous RDMA operation.

Figure 12:
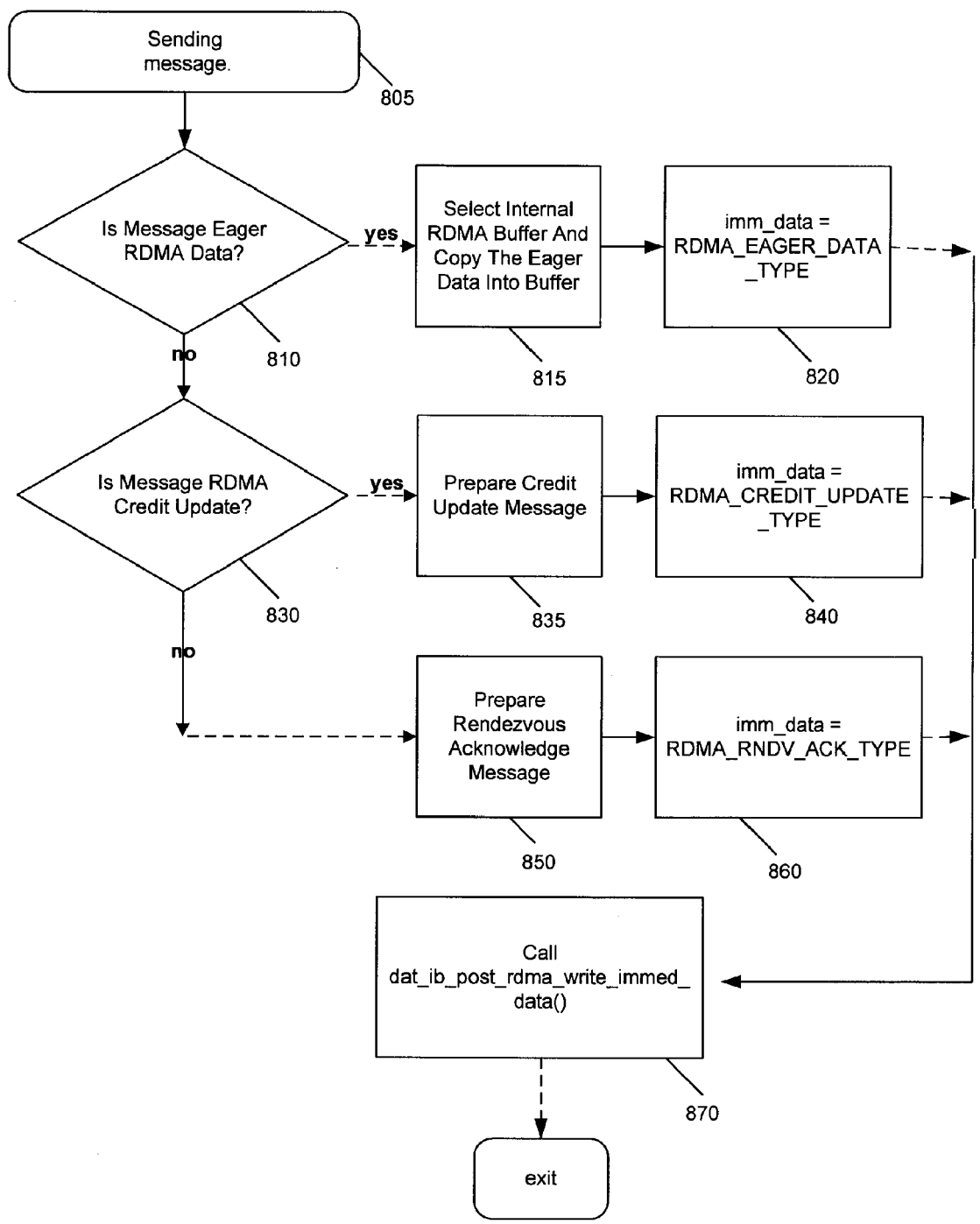
FIG. 12 is a flow diagram of a method of sending a message over an internal packet in accordance with one embodiment of the present invention.

Referring now to FIG. 12, shown is a flow diagram of a method of sending a message or an internal packet in accordance with one embodiment of the present invention. As shown in FIG. 12, method 800 may begin a process for sending a message (block 805). First, it may be determined whether the message is eager RDMA data (diamond 810). If so, an internal RDMA buffer may be selected and the eager data is copied into the buffer (block 815). In addition, the immediate data associated with the message may be set to RDMA_Eager_Data_Type (block 820). As described above, in some implementations the immediate data may be of four-byte size to specify the operation type to a receiving process.

Referring still to FIG. 12, if instead the message is not eager RDMA data, control passes to diamond 830 where it may be determined whether the message is a RDMA credit update message. If so, the credit update message may be prepared (block 835), and immediate data set to RDMA_CREDIT_UPDATE_TYPE (block 840). Otherwise, control may pass from diamond 830 to block 850, where a rendezvous acknowledge message may be prepared, and the immediate data set to RDMA_RNDV_ACK_TYPE (block 860).

As further shown in FIG. 12, after preparing the message and associated immediate data, a RDMA write with immediate data function call, namely dat_ib_post_rdma_write_immed_data( ), may be called to thus perform the RDMA write with immediate data (block 870).

To handle a received message, a receiving process posts in advance several "recv" operations calling a dat_ep_post_recv( ) function to get the immediate data from the sending process. The completion of the "recv" operation guarantees that the main useful data transferred by RDMA write has been delivered. In order to detect the completion of "recv" operations, the process calls either dat_evd_dequeu( ) to inquire a receive EVD or dat_evd_wait( ) to wait for a DTO completion event without processor utilization.

Figure 13:
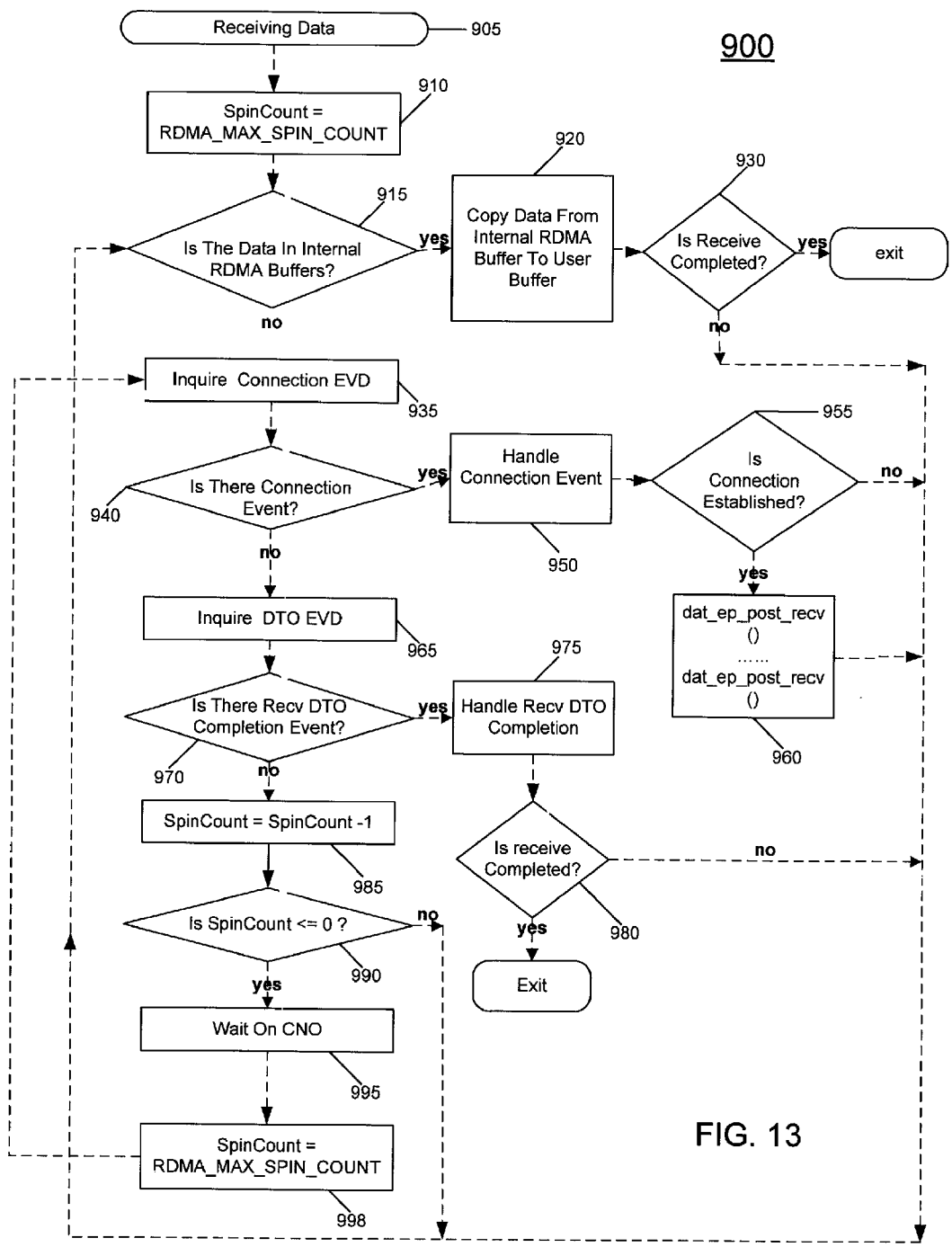
FIG. 13 is a flow diagram of a method of receiving a message or internal packet in accordance with an embodiment of the present invention.

Referring now to FIG. 13, shown is a flow diagram of a method of receiving a message or internal packet in accordance with an embodiment of the present invention. As shown in FIG. 13, method 900 may begin by receiving data (block 905). Then a spin count may be set at a maximal value, namely RDMA_Max_Spin_Count (block 910). Depending on the value of the variable RDMA_Max_Spin_Count, controllable through a respective environment variable, the ratio between polling and waiting mode is changed accordingly. For example, if this variable is equal to one, a pure wait mode exists, without any polling. If this variable is equal to 250 (for example), the wait on consumer notification object (CNO) (block 995, see below) is executed relatively rarely. This approximates the efficiency of the polling mode, and at the same time, in absence of a message to react to, the process almost immediately enters the wait mode.

Control passes then to diamond 915 where it may be determined whether there is any data in internal RDMA buffers. If so, the data may be copied to a user buffer (block 920). Next it may be determined whether the receive is completed (diamond 930). If so, the method may conclude, otherwise control passes back to diamond 915.

If there is no data in the internal RDMA buffers, next a connection EVD may be inquired (block 935), and it may be determined if there are any connection events (diamond 940). If so, the connection event may be handled (block 950). Then it may be determined whether a connection is established (diamond 955). If so, the function calls for hosting the "recv" operations may be called (block 960). In either event, control passes back again to diamond 915.

Referring still to FIG. 13, if it is determined at diamond 940 that there are no connection events, control passes to block 965 where a DTO EVD may be checked. Then it may be determined whether there are recv DTO completion events (diamond 970). If so, the recv DTO completion may be handled (block 975). Such handling will be discussed further below with regard to FIG. 14. Then it may be determined at diamond 980 if the receive is completed. If so the method may conclude, otherwise control passes again back to diamond 915.

Referring still to FIG. 13, if there are no DTO completion events, the spin count is decremented (block 985). It is then determined whether the spin count is less than or equal to zero (diamond 990). If not, control again passes back to diamond 915. Otherwise, a wait on CNO may occur (block 995). Note that the DAPL Consumer Notification object concatenates several DAPL event dispatchers. In a given case, it concatenates connection EVD (inquired in 935) and DTO EVD (inquired in 965). A special call dat_cno_wait( ) allows the calling process to wait without CPU utilization until the event is raised on one of aforementioned EVDs. In each case it can be connection event or DTO completion event. The return from dat_cno_wait( ) means that EVDs associated with CNO receive the event and should be inquired so control passes to block 935. Then the spin count may be reset back to its maximum value (block 998), and control passes back to block 935. While shown with this particular implementation in the embodiment of FIG. 13, the scope of the present invention is not limited in this regard.

Figure 14:
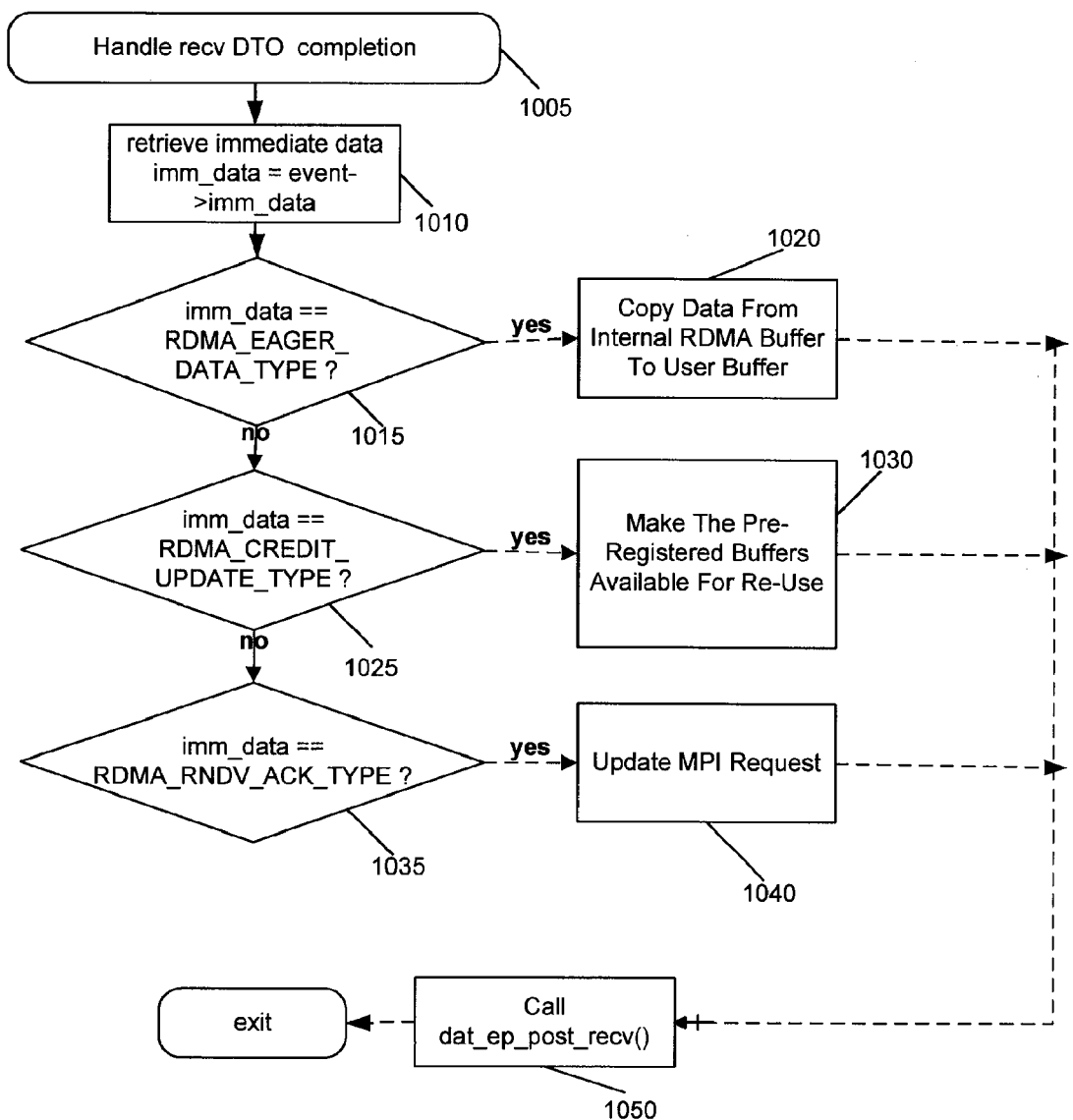
FIG. 14 is a flow diagram of a method for completion handling in accordance with one embodiment of the present invention.

Note that when a "recv" DTO completion event is received, the immediate data will be retrieved, the type of RDMA Write operation will be analyzed so that the transferred data will be handled in the appropriate way, as shown in FIG. 14, which is a flow diagram of a method 1000 of handling completion of a receive DTO. To being the handling (block 1005), immediate data may be retrieved from the "event" structure and moved to an imm_data variable (block 1010). Then, control passes to a series of determinations to determine the type of RDMA write operation. Specifically, it may be determined whether the immediate data is RDMA eager data (diamond 1015). If so, control passes to block 1020 where the eager data will be copied from an internal pre-registered eager buffer to a user buffer. Otherwise, control passes to diamond 1025 where it may be determined whether the immediate data is a credit update message. If it is a credit update message, the corresponding pre-registered buffers for sending become available to re-use (block 1030). Otherwise, control passes to diamond 1035 where it may determined whether the immediate data indicates that the RDMA write operation is a rendezvous ACK message. If it is a rendezvous ACK message, the status of the corresponding MPI request will be updated, and the MPI request may become completed if all required data have been transferred (block 1040). Control then passes to block 1050, where the function dat_ep_post_recv( ) may be called to get the immediate data of other RDMA write with immediate operations from the sending process.

If dynamic connection (on demand) mode is used, an additional EVD may be created to handle the connection events. In this case a DAPL CNO object is used to consolidate several event dispatchers and is allowed to wait (calling dat_cno_wait) for the events related to both connection establishment and DTO completions. Thus using such an embodiment, the latencies of short-size messages in wait mode of, e.g., an InfiniBand RDMA path can be reduced.

Figure 15:
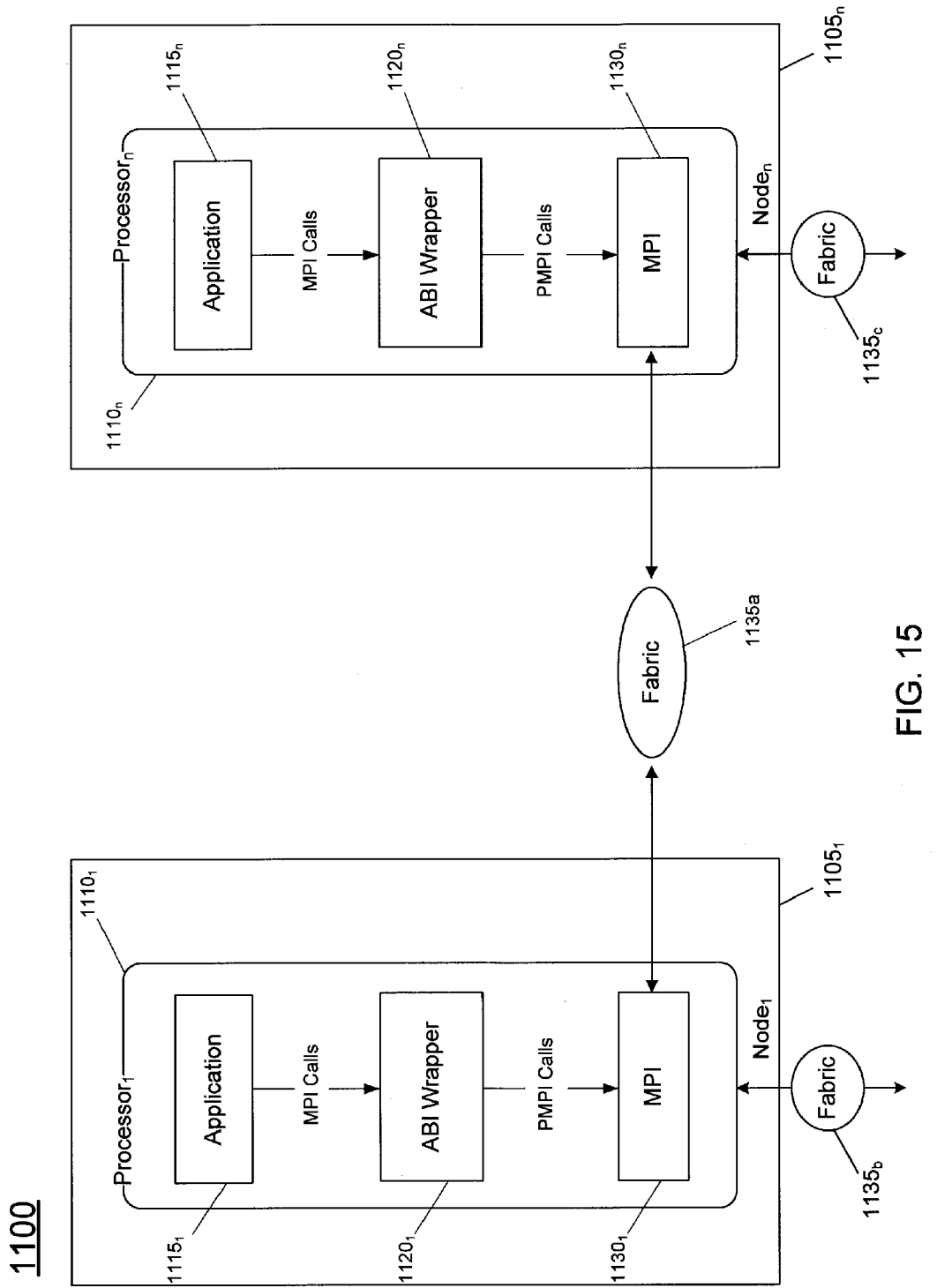
FIG. 15 is a block diagram of a system in accordance with one embodiment of the present invention.

Embodiments can be implemented in different system types. Shown in FIG. 15 is a block diagram of a system in accordance with one embodiment of the present invention. Specifically, system 1100 includes a plurality of nodes $1105_1$-$1105_n$ (generically node 1105), each of which may include multiple processors that can execute various processes. As shown in FIG. 15, a plurality of processors $1110_1$-$1110_n$ (generically processor 1110) are shown within the nodes, although for ease of illustration only a single processor is shown in each node. Understand that in various embodiments each processor may be a multicore processor including a plurality of cores, each of which is able to independently execute a different process. Each processor may include a process or application $1115_1$-$1115_n$ (generically application 1115). In some embodiments, the system of FIG. 15 is an exemplary distributed application which is cooperatively implemented via generally contemporaneous execution of machine accessible instructions of multiple processors 1110. In particular, a first process (i.e., software application $1115_1$) may be executed on first processor $1110_1$ and a second process $1115_n$, which may be a parallel process, may be executed by second processor $1110_n$, which cooperatively realize the example distributed application using any variety of distributed computing algorithms, techniques and/or methods. In the example system of FIG. 15, the example software applications 1115 implement different machine accessible instructions. Alternatively, the example software applications may implement similar and/or identical machine accessible instructions.

For simplicity and ease of understanding, the example two node system of FIG. 15 is referenced. However, distributed applications may be implemented by systems incorporating any number and/or variety of nodes and processors. For example, one or more processes of a distributed application may be implemented by a single processor, a single process may be implemented by each processor, etc.

Each application 1115 may be written and linked to a MPI implementation different than that of an associated MPI library 1130 (generally). To enable easy transition to the corresponding native MPI 1130, an application binary interface (ABI) wrapper $1120_1$-$1120_n$ (generically wrapper 1130) written to the same MPI implementation as application 1115 may intercept MPI calls made by the process 1115 to library $1130_1$-$1130_n$ (generically library 1130) of FIG. 15, which facilitates the exchange of, for example, distributed application messages, between applications 1115. ABI wrapper 1120 thus calls MPI library 1130 using profiling MPI (PMPI) calls. In turn, these MPI libraries 1130 may perform requested operations for application 1115 which may be transmitted via a fabric 1135a which, in one embodiment may be a fast interconnect such as a point-to-point (PtP) interconnect, although the scope of the present invention is not limited in this regard. Also, each node 1105 may have additional fabrics 1135b and 1135c (for example). Still further, inter-processor fabrics such as a shared memory connection fabric may be present between processes that are executed on different processors of a single node.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A system comprising:
a first processor to send a message from a first process executing on the first processor to a second process executing on a second processor, wherein the first process is to send the message while the second process is in a wait state; the second processor to receive the message from the first process while the second process is in the wait state, wherein the first process is to send a wake up message to the second process based on a state of a synchronization block for the second process if the second process is in the wait state when the message is sent; and
a dynamic random access memory (DRAM) coupled to the first and second processors and including instructions to create a shared memory segment having a location distributed using an out-of-band communication, the shared memory segment to store a synchronization block for the first process and store the synchronization block for the second process, wherein each synchronization block includes a wait flag to indicate that the associated process is in the wait state and a wake up counter to indicate a number of messages sent by the associated process to another process that have not been received.

2. The system of claim 1, wherein the first process is to check the wait flag of the corresponding synchronization block for the second process and send the wake up message if the wait flag indicates that the second process is in the wait state and the wake up counter is equal to zero.

3. The system of claim 2, wherein the first process is to send the message via a shared memory buffer and to send the wake up message via a secondary connection.

4. The system of claim 2, wherein the first process is to lock the synchronization block for the second process before accessing the synchronization block and to unlock the synchronization block after accessing the synchronization block.

5. The system of claim 1, wherein the first process is to first send the message and to thereafter determine if the second process is in the wait state.

6. The system of claim 1, wherein the second process is to unlock the synchronization block for the second process before entering the wait state.

7. A method comprising:
creating a shared memory segment having a location distributed using an out-of-band communication and to store a synchronization block for each of a plurality of processes that execute in a message passing interface (MPI) library, wherein each synchronization block includes a wait flag to indicate that the associated process is in a wait state, a first counter to indicate a number of messages sent by the associated process to another process that have not been received, and a pointer to a mutex for synchronization of processes during access to the synchronization block;
transferring a message from a first process to a shared memory buffer of a second process via a shared memory connection; and
sending a wake up message from the first process to the second process via a secondary connection if the second process is in the wait state.

8. The method of claim 7, further comprising moving the message from the shared memory buffer to a user buffer of the second process.

9. The method of claim 8, further comprising sending a wake up message from the second process to the first process if the first process is in the wait state when the second process moves the message.

10. The method of claim 9, further comprising de-allocating the shared memory buffer via the first process after the first process is activated from the wait state.

* * * * *